(12) United States Patent
McIntyre

(10) Patent No.: US 8,439,648 B2
(45) Date of Patent: May 14, 2013

(54) PROCESS WATER LIFT STATION APPARATUS

(75) Inventor: Roy Harrison McIntyre, Youngsville, LA (US)

(73) Assignee: National Oilwell Varco, L.P., Houston, TX (US)

( * ) Notice: Subject to any disclaimer, the term of this patent is extended or adjusted under 35 U.S.C. 154(b) by 293 days.

(21) Appl. No.: 12/841,300

(22) Filed: Jul. 22, 2010

(65) Prior Publication Data

US 2012/0018017 A1    Jan. 26, 2012

(51) Int. Cl.
*F04B 49/04* (2006.01)
(52) U.S. Cl.
USPC ............... 417/40; 417/36; 417/300; 137/363

(58) Field of Classification Search ................... 417/36, 417/40, 300; 137/363
See application file for complete search history.

(56) References Cited

U.S. PATENT DOCUMENTS

| | | | | |
|---|---|---|---|---|
| 3,112,760 | A * | 12/1963 | Budd | 137/363 |
| 5,645,732 | A * | 7/1997 | Daniels | 210/747.1 |
| 5,906,479 | A * | 5/1999 | Hawes | 417/360 |
| 2007/0025860 | A1 * | 2/2007 | Polino | 417/36 |

* cited by examiner

*Primary Examiner* — Charles G Freay
*Assistant Examiner* — Patrick Hamo
(74) *Attorney, Agent, or Firm* — The JL Salazar Law Firm, pllc

(57) ABSTRACT

A lift station containing a tube, an access box connected to the tube, and an inner pipe that is removable, positioned in the tube that can be used to contain and discharge process water. The design aids in construction and maintenance and can detect leaks that can reduce process water contamination of surrounding soil.

20 Claims, 7 Drawing Sheets

PROCESS WATER LIFT STATION APPARATUS

CROSS-REFERENCE TO RELATED APPLICATIONS

Not applicable.

FIELD

The embodiments of the present invention relate to lift stations for the collecting and disposing of process water.

BACKGROUND

Industrial processes typically involve the use of hydrocarbons, such as oil, and other compositions that require specialized disposal. During the course of operations of industrial processes, the oil and other compositions requiring specialized disposal can be mixed with water from various sources, such as for example pressure washing. The mixture of water with oil and/or other contaminants is typically referred to as process water. Process water cannot be directly disposed of due to the oil and/or other contaminants in the process water.

Process water typically passes from work areas through an ordinary underground oil-water separator and then into a cleaning system. The pumps and switches which move the water from the separator to the cleaning system are not typically placed inside the separator itself in order to allow for maintenance access. Instead, the pumps and switches are placed in a lift station, which is essentially a tub positioned in a convenient location and supplied with water from the separator via gravity. Pumps and float switches in the lift station are designed to move the water into the cleaning system.

Current lift stations are generally constructed by placing a length of cement culvert vertically in the ground and pouring additional concrete therein to form a bottom. However, the wet concrete poured into the ground may not seal with the culvert, which can result in underground leakage of process water. Lift stations can also be constructed from pre-formed fiberglass or plastic. However, these pre-formed lift stations can crack underground, which can cause process water to unknowingly leak into the soil. Additionally, pre-formed lift stations may not have the desired shape, size, or aspect ratio for each specific project.

Since lift stations are normally buried at the same depth as the separator, cleaning soil contaminated by leaking process water can be extremely expensive and disruptive. Cleaning the surrounding soil typically requires the destruction of concrete, the removal of large amounts of dirt, and the replacement of piping.

In view of the above, it would be desirable to have a lift station that can be customized to any construction project or installation area. It would also be desirable to detect an underground leak before process water has entered the soil. Furthermore, it would be desirable to have a lift station that allows for the easy removal and replacement of leaking parts.

SUMMARY

An embodiment of the present invention is a lift station that includes a tube, an access box connected to the tube, and an inner pipe positioned in the tube. The inner pipe can be removable from the tube and the space between the tube and the inner pipe can form an inspection window where water can be observed if the inner pipe were to leak. There can be at least one centralizer positioned between the tube and the inner pipe, which can be made of rods, plates, or pad eyes. The inspection window can be a space of at least 0.5 inch (1.27 centimeters) between the tube and the inner pipe.

A pump can be located at the bottom end of the inner pipe that can be activated by a float switch located inside the inner pipe. The pump can remove process water from the lift station.

The inner pipe can have an inlet pipe attached to a side wall of the inner pipe that enables process water to enter the inner pipe. The tube can have a groove in its side wall that allows for the removal and/or placement of the inner pipe with the inlet pipe, where the inlet pipe is located within the groove.

The tube and the inner pipe can be made of materials such as carbon steel, stainless steel, iron, aluminum, fiberglass, plastic, and any other polymeric material and any combinations thereof.

DETAILED DESCRIPTION

The present invention provides for a lift station that allows for the early detection of leaks. In the case of leaks, the present invention also provides for easy removal and replacement or repair of the leaking components.

Figure 1:
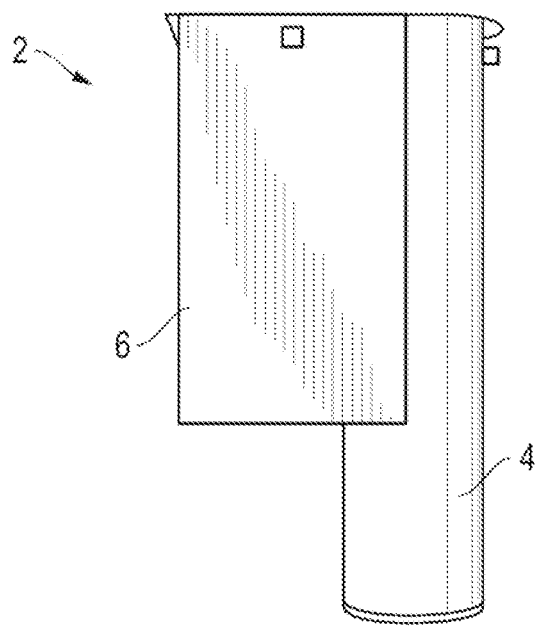
FIG. 1 is a side view of a lift station of an embodiment of the present invention.
Figure 2:
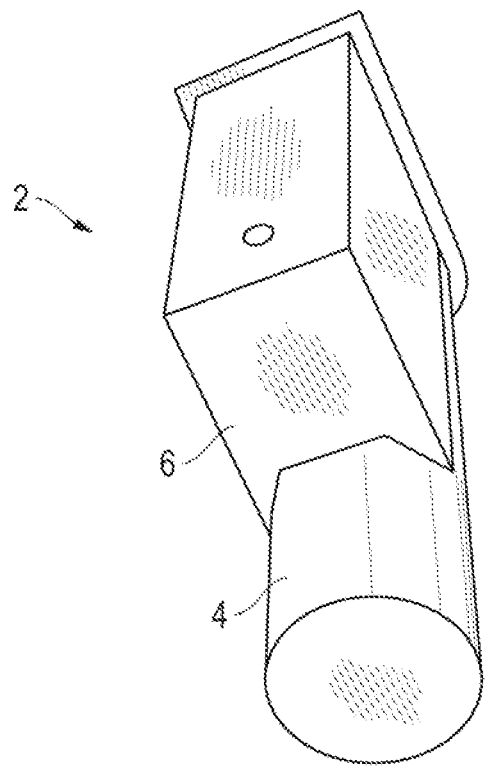
FIG. 2 is a bottom view of a lift station of an embodiment of the present invention.

Referring to FIGS. 1 and 2 of the drawings, there is shown an embodiment of a lift station of the present invention. FIG. 1 depicts a side view of the lift station 2 having a tube 4 that is connected to an access box 6. FIG. 2 depicts a bottom view of the lift station 2 having a tube 4 that is connected to an access box 6.

Figure 3:
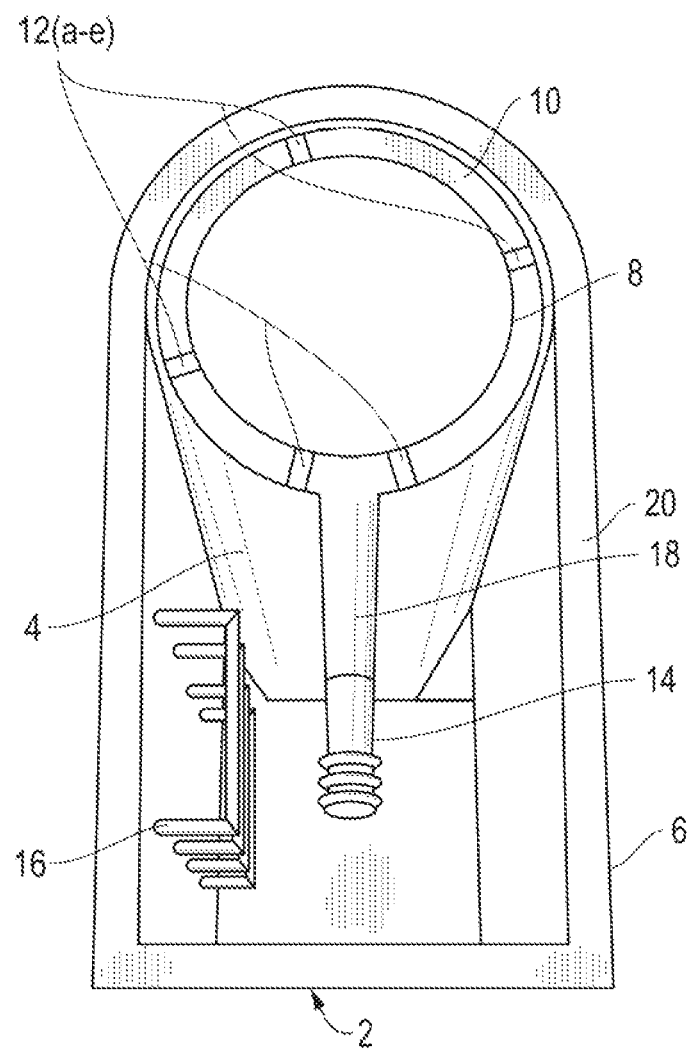
FIG. 3 is a top view of a lift station of an embodiment of the present invention.

FIG. 3 depicts a top view of the lift station 2 containing a tube 4 connected to an access box 6 having a ladder 16. The access box also contains an outer lip 20 that surrounds at least a portion of the top edge of the access box 6. The outer lip 20 can be used to secure the lift station 2 to a foundation or other means of support. An inner pipe 8 is positioned within the tube 4 and held in place by centralizers 12(a-e) such that a space, also referred to as an inspection window 10, is created between the tube 4 and the inner pipe 8. In an embodiment, the inspection window is a space of at least 0.5 inch (1.27 centimeters) between the tube 4 and the inner pipe 8. In another embodiment, the inspection window is a space ranging from 1 to 5 inches (2.54 to 12.7 centimeters) between the tube 4 and the inner pipe 8. A probe, float device or other means to detect water can be placed within the inspection window 10 to detect any water that may leak from the inner pipe 8. FIG. 3 also depicts where the inner pipe 8 is connected to an inlet pipe 14, which is situated within a groove 18 in the tube 4. The groove 18 enables the removal of the inner pipe 8 from the tube 4 with minimal disassembly of the lift station 2 components.

In an embodiment, the lift station 2 can be constructed of any desired material. In an embodiment, the lift station 2 is constructed of materials selected from the group of carbon steel, stainless steel, iron, aluminum, fiberglass, plastic, and any other polymeric material and any combinations thereof. In an embodiment, the tube 4 is constructed of materials selected from the group of carbon steel, stainless steel, iron, aluminum, fiberglass, plastic, and any other polymeric material and any combinations thereof. In an embodiment, the inner pipe 8 is constructed of materials selected from the group of carbon steel, stainless steel, iron, aluminum, fiberglass, plastic, and any other polymeric material and any combinations thereof.

Figure 4A:
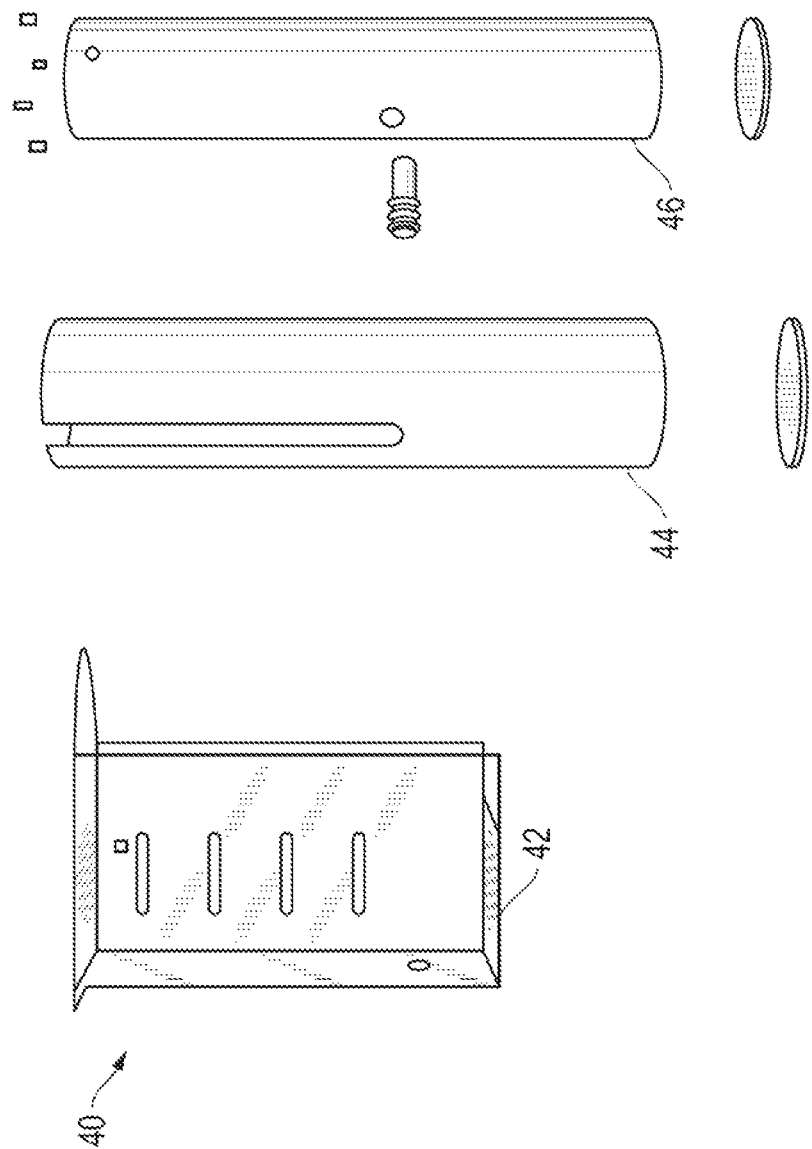
FIG. 4A is an exploded view of a lift station of an embodiment of the present invention.

Referring now to FIG. 4A, a lift station 40 is depicted in an exploded view showing the component parts of the lift station 40. FIG. 4A shows the lift station 40 as being composed of essentially three main parts, which include the access box 42, the tube 44 and the inner pipe 46.

Figure 4B:
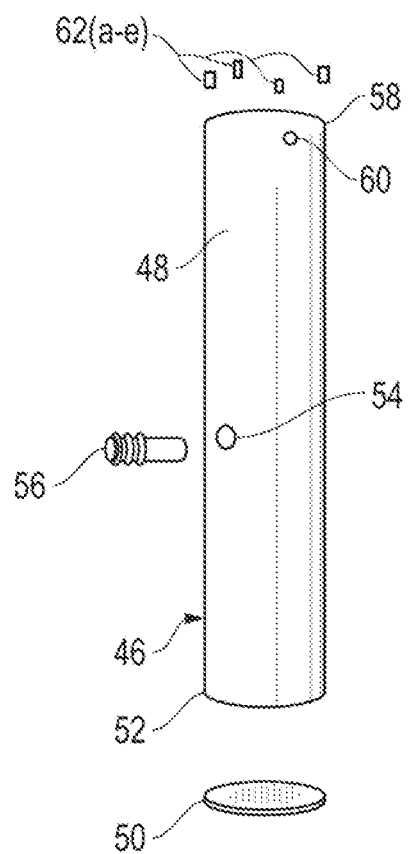
FIG. 4B is an exploded view of an inner pipe portion of an embodiment of the present invention.

FIG. 4B illustrates in detail the inner pipe 46. This inner pipe 46 is capable of being lowered into and removed from the tube 44 (depicted in FIG. 4A), thus limiting the amount of work needed to replace a leaking inner pipe. In an embodiment, the inner pipe 46 has an inner diameter ranging from 1 inch to 100 inches (2.54 centimeters to 254 centimeters). In another embodiment, the inner pipe 46 has an inner diameter ranging from 10 to 50 inches (25.4 to 127 centimeters). In a further embodiment, the inner pipe 46 has an inner diameter ranging from 20 to 40 inches (50.8 to 101.6 centimeters). In an embodiment, the inner pipe 46 has a length ranging from 3 feet to 30 feet (91 meter to 9.14 meters). In another embodiment, the inner pipe has a length ranging from 5 feet to 20 feet (1.52 meters to 6.1 meters). In an aspect, the inner pipe 46 is shorter than the tube 44. In another aspect, the inner pipe 46 is at least 1% shorter than the tube 44. In a further aspect, the inner pipe 46 is at least 10% shorter than the tube 44. In the embodiment illustrated, the inner pipe is the same length as the outer pipe. However, it is only necessary that the inner pipe be of a length equal to the distance from the floor plate of the outer pipe to the top of the inflow pipe.

An inner pipe floor plate 50 is connected to the bottom end 52 of the inner pipe 46. In an embodiment, the inner pipe floor plate 50 is connected to the bottom end 52 of the inner pipe 46 creating a leak-free seal between the inner pipe 46 and the inner pipe floor plate 50. In another embodiment, the inner pipe floor plate 50 is welded to the bottom end 52 of the inner pipe 46. In a further embodiment, the inner pipe 46 is constructed, or molded, to create a one-piece construction such that the inner pipe floor plate 50 is integrated with the bottom end 52 of the inner pipe 46.

An inlet hole 54 is present on the side wall of the inner pipe 46 through which an inlet pipe 56 is positioned. The inlet hole 54 may be positioned at a point along the side wall of the inner pipe 46. In an embodiment, the inlet hole 54 and inlet pipe 56 are positioned in the side wall of the inner pipe 46 such that the inlet pipe 56 faces the access box 42.

The inner pipe 46 contains an upper end 58. Lifting hole(s) 60 can be located at the upper end 58 of the inner pipe 46 in order to aid in the installation and removal of the inner pipe 46 into and out of the tube 44 of the lift station 40. The lifting hole(s) 60 can include holes, grooves, handles, gaps, or any other feature that can aid in the lifting of the inner pipe 46. Centralizers 62(a-e) may also be located at the upper end 58 of the inner pipe 46 in order to position the inner pipe 46 in the center of tube 44. In an embodiment, the centralizers 62(a-e) includes at least one centralizer. In another embodiment, the centralizers 62(a-e) include 2 to 8 centralizers. The centralizers 62(a-e) can include rods, plates, pad eyes, or any other projection. The centralizers 62(a-e) can be welded to, integral with, fastened to, or otherwise attached to the exterior of the inner pipe 46. In another embodiment, one or more of the centralizers 62(a-e) serve as lifting lugs in addition to the centralizing the inner pipe 46 in the tube 44. Additional centralizers can be located along the length of the inner pipe 46, such as in the middle and/or bottom of the inner pipe 46.

Figure 4C:
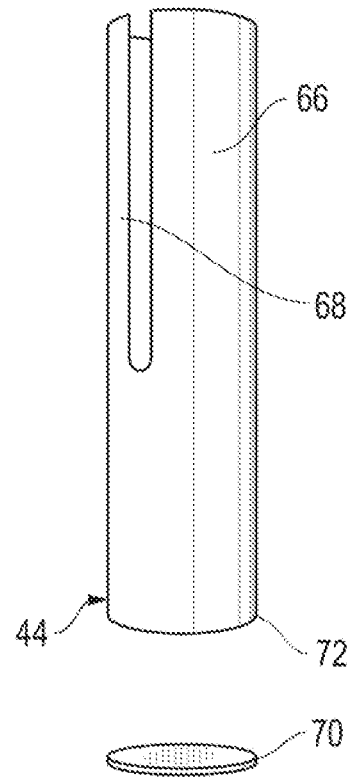
FIG. 4C is an exploded view of a tube portion of an embodiment of the present invention.

FIG. 4C illustrates in detail the tube 44. In this illustration the tube 44 contains an outer hull 66 that is capable of receiving the inner pipe 46 (depicted in FIGS. 4A and 4B) and of restraining any leaks that may arise from the inner pipe 46. In an embodiment, the tube 44 has an inner diameter ranging from 2 to 120 inches (5.08 to 304.8 centimeters). In another embodiment, the tube 44 has an inner diameter ranging from 15 to 75 inches (38.1 to 190.5 centimeters). In a further embodiment, the tube 44 has an inner diameter ranging from 25 to 50 inches (63.5 to 127 centimeters). In an embodiment, the tube 44 has a length ranging from 5 feet to 40 feet (1.52 meters to 12.19 meters). In another embodiment, the tube 44 has a length ranging from 7 feet to 30 feet (2.13 meters to 9.14 meters). In an aspect, the inner pipe 46 is shorter than the tube 44. In another aspect, the inner pipe 46 is at least 1% shorter than the tube 44. In a further aspect, the inner pipe 46 is at least 10% shorter than the tube 44. The tube 44 also contains a groove 68. Groove 68 is designed to allow for the passage of the inlet pipe 56 (depicted in FIG. 4B) attached to the inner pipe 46, when the inner pipe 46 is lowered into the tube 44. The groove 68 facilitates the removal of the inner pipe 46 for maintenance or repairs. The tube 44 may also contain a sump (not shown) for collecting water, sand, etc. In an embodiment, rods, plates, pad eyes, or any other projection may be welded to, integral with, fastened to, or otherwise attached to the inner surface of the tube 44 to space the inner pipe 46 within the tube 44. In an embodiment, rods, plates, pad eyes, or any other projection may be welded to, integral with, fastened to, or otherwise attached to the outer surface of the tube 44 to space the tube 44 within the access box 42.

A tube floor plate 70 is connected to the bottom end 72 of the tube 44. In an embodiment, the tube floor plate 70 is connected to the bottom end 72 of the tube 44 creating a leak-free seal between the tube 44 and the tube floor plate 70. In another embodiment, the tube floor plate 70 is welded to the bottom end 72 of the tube 44. In a further embodiment, the tube 44 is constructed, or molded, to create a one-piece construction such that the tube floor plate 70 is integrated with the bottom end 72 of the tube 44. In an aspect, the tube floor plate 70 has an outer diameter greater than the outer diameter of the tube 44. In another aspect, the tube floor plate 70 has an outer diameter ranging from 1 to 10 inches (2.54 to 25.4 centimeters) larger than the outer diameter of tube 44. The larger tube floor plate 70 can be used to create an anti-flotation flange that could anchor the assembly and prevent the floatation of the tube 44 in case of high or rising ground water that could act to raise the lift station from its desired location.

Figure 4D:
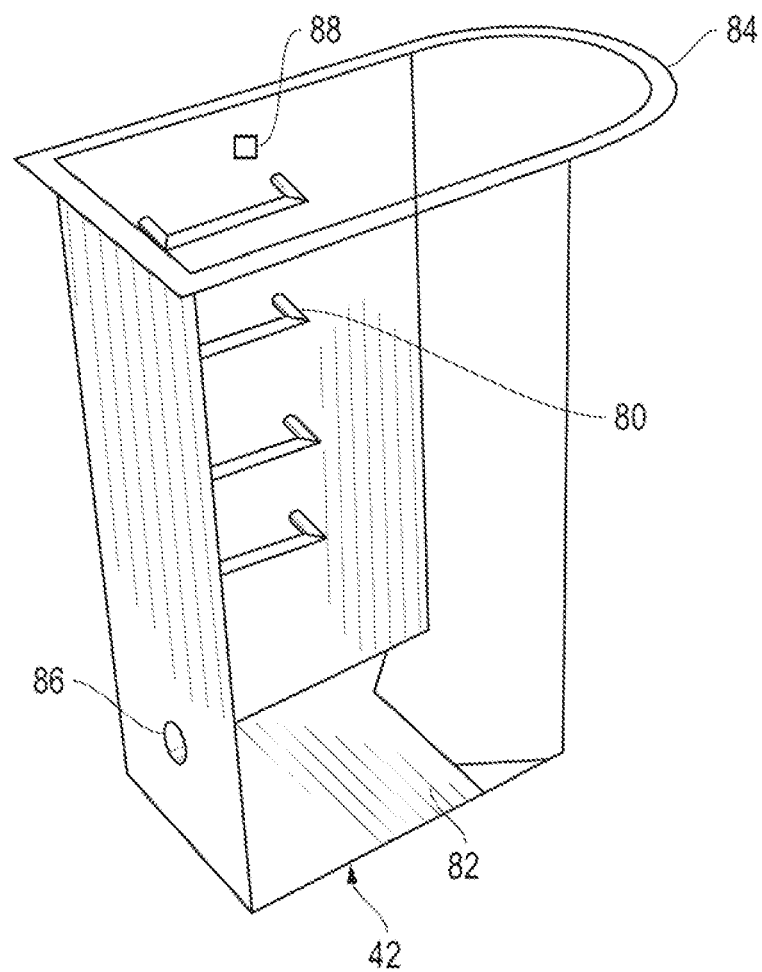
FIG. 4D is a perspective cross-sectional view of an access box portion of an embodiment of the present invention.

FIG. 4D illustrates in detail an embodiment of the access box 42. In this illustration, access box 42 contains a ladder 80 and a standing area 82. The access box 42 contains a lip 84 that is designed to wrap around the top of the lift station 2 allowing the lift station 2 to rest on concrete or any other type foundation or support. The access box 42 also contains a hole 86 for bringing water into the lift station 2. The access box 42 may also contain studs 88 on the outer surface of the access box wherein the studs 88 are designed to project into concrete or other type foundation in order to anchor the lift station 2. In an embodiment the lift station 2 includes a lid for covering the top of the lift station to restrict rain water or surface water from entering the lift station.

Figure 5:
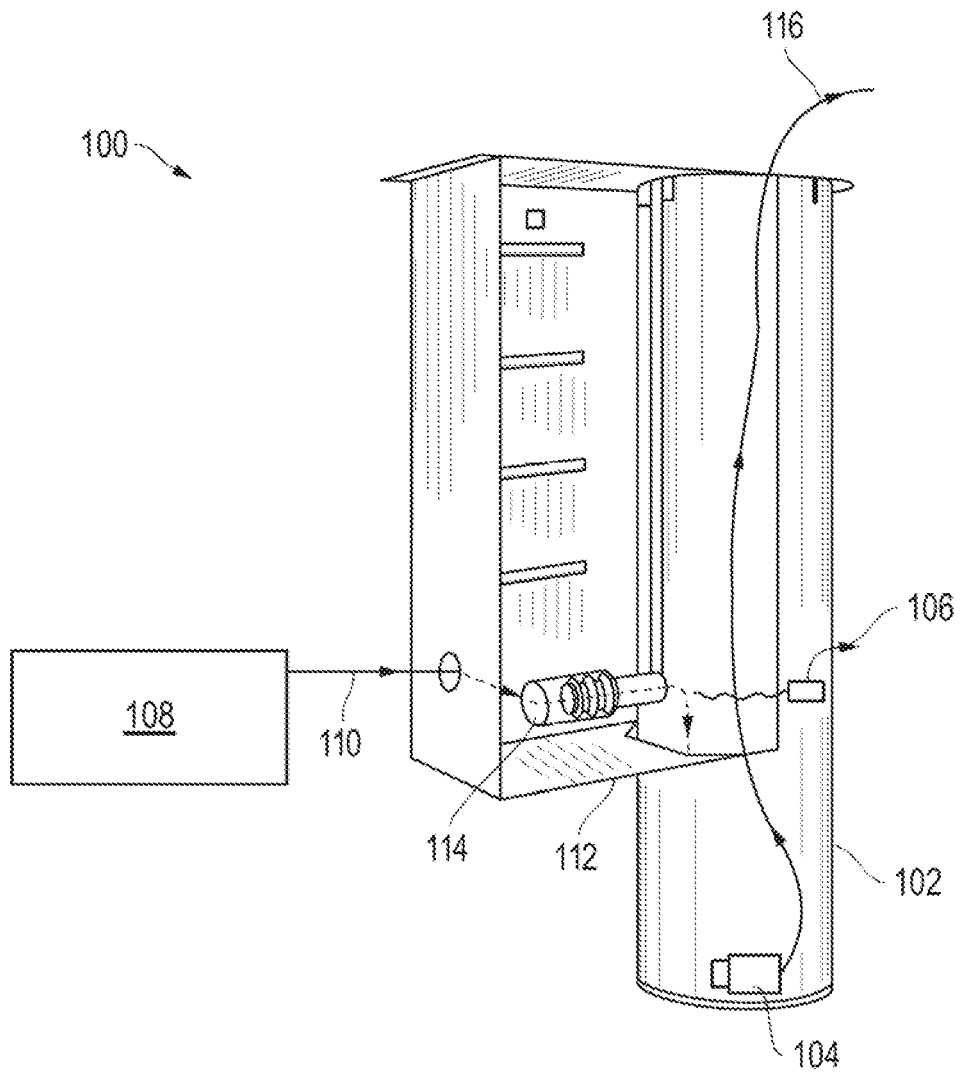
FIG. 5 is a perspective cross-sectional view showing component parts of a lift station of an embodiment of the present invention.

FIG. 5 depicts a perspective cross-sectional view of a lift station of the present invention. The lift station 100 contains an inner pipe 102 having a pump 104 located at the bottom of the inner pipe 102. The pump 104 can be activated by a float switch 106 wherein the float switch is located in the inner pipe 102. The pump 104 and/or float switch 106 can be located within or adjacent to the lift station 100, such as in the access box. The access box can include areas for controls, switches, wires, pipes, etc.

An oil-water separator 108 can be used to supply water to the inner pipe 102 via a first pipe 110 connected to the oil-water separator 108 on one end and to the inlet pipe 112 on the other end. The inlet pipe 112 may optionally contain a rubber boot and hose clamps 114 to aid in connecting the inlet pipe 112 with the first pipe 110. Water may be removed from the inner pipe 102 via a second pipe 116 that is connected to the pump 104. The first pipe 110 can be sealed within the hole in the access box for bringing water into the lift station.

The first pipe 110, inlet pipe 112 and inner pipe 102 can form a closed system that keeps the water from entering the access box. If a leak is present in any of these components the leaking water will enter the access box or the space between the inner pipe and the tube, which can be referred to herein as an inspection window. Water leaking into the inspection window and can rise to a height where it can pass through the groove/slot in the tube and enter the access box where it can be contained and detected. Water detectors can be included in the inspection window and/or in the access box which can detect and signal whether water has entered these areas. A tightly-fitting cap can be emplaced covering the top of the entire assembly (access box and outer tube) in order to prevent rain or other water from entering the access box and inspection window.

Figure 6:
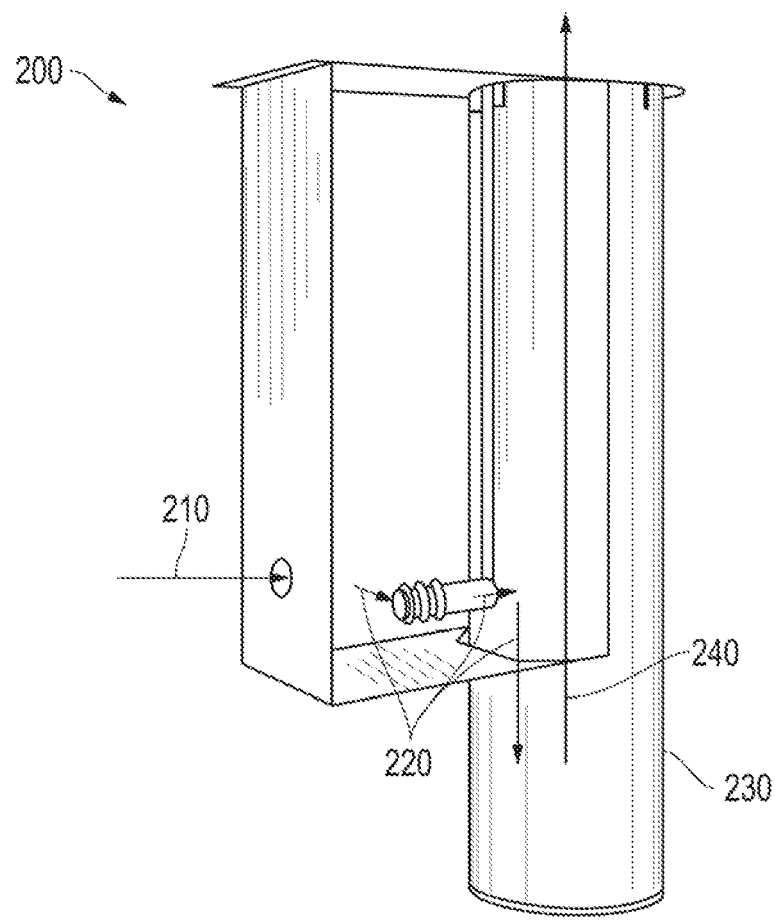
FIG. 6 illustrates the function of a lift station of an embodiment of the present invention.

FIG. 6 depicts a flow scheme of a lift station 200. Arrow 210 shows water gravity feeding in from a separator (not shown). Arrows 220 show water gravity feeding through a rubber boot (not shown) connecting the separator outflow with the inner pipe 230. Arrow 240 shows water being pumped out of the lift station, such as to water reclamation equipment.

Various terms are used herein, to the extent a term used in not defined herein, it should be given the broadest definition persons in the pertinent art have given that term as reflected in printed publications and issued patents.

Depending on the context, all references herein to the "invention" may in some cases refer to certain specific embodiments only. In other cases it may refer to subject matter recited in one or more, but not necessarily all, of the claims. While the foregoing is directed to embodiments, versions and examples of the present invention, which are included to enable a person of ordinary skill in the art to make and use the inventions when the information in this patent is combined with available information and technology, the inventions are not limited to only these particular embodiments, versions and examples. Other and further embodiments, versions and examples of the invention may be devised without departing from the basic scope thereof.

What is claimed is:

1. A lift station comprising:
   a tube;
   an access box connected to the tube along an outer surface of the tube between a first and a second end of the tube, the access box defining a standing area adjacent the outer surface; and
   an inner pipe positioned in the tube.

2. The lift station of claim 1, wherein the inner pipe is removable from the tube.

3. The lift station of claim 1, further comprising an inspection window between the tube and the inner pipe.

4. The lift station of claim 1, further comprising at least one centralizer positioned between the tube and the inner pipe.

5. The lift station of claim 4, wherein the at least one centralizer comprises rods, plates, or pad eyes.

6. The lift station of claim 1, wherein the inner pipe has a shorter length than the tube.

7. The lift station of claim 1, wherein the inner pipe has a length of at least 10% shorter than the tube.

8. The lift station of claim 1, wherein the inner pipe has a diameter ranging from 10 to 50 inches (25.4 to 127 centimeters).

9. The lift station of claim 1, wherein the tube has a diameter ranging from 15 to 75 inches (38.1 to 190.5 centimeters).

10. The lift station of claim 3, wherein the inspection window is a space' of at least 0.5 inch (1.27 centimeters) between the tube and the inner pipe.

11. The lift station of claim 1, wherein the inner pipe is attached to an inner pipe floor plate.

12. The lift station of claim 1, wherein the tube is attached to a tube floor plate.

13. The lift station of claim 1, further comprising a pump located at the bottom end of the inner pipe.

14. The lift station of claim 13, wherein the pump is activated by a float switch located inside the inner pipe.

15. The lift station of claim 1, wherein the inner pipe comprises an inlet pipe attached to a side wall of the inner pipe.

16. The lift station of claim 15, wherein the tube comprises a groove that allows for the removal and/or placement of the inner pipe comprising an inlet pipe.

17. The lift station of claim 1, wherein the tube comprises a sump.

18. The lift station of claim 1, wherein the tube is comprised of materials selected from the group consisting of carbon steel, stainless steel, iron, aluminum, fiberglass, plastic, and any other polymeric material and any combinations thereof.

19. The lift station of claim 1, wherein the inner pipe is comprised of materials selected from the group consisting of carbon steel, stainless steel, iron, aluminum, fiberglass, plastic, and any other polymeric material and any combinations thereof.

20. A lift station comprising:
   a tube having a tube floor plate;
   an access box connected to the tube; and
   an inner pipe having an inner pipe floor plate, positioned in the tube wherein the inner pipe is removable from the tube;
   an inspection window between the tube and the inner pipe space of at least 0.5 inch (1.27 centimeters);
   at least one centralizer positioned between the tube and the inner pipe;
   a pump located at the bottom end of the inner pipe capable of pumping water out of the inner pipe;

wherein the inner pipe comprises an inlet pipe attached to a side wall of the inner pipe; and wherein the tube comprises a groove that allows for the removal and/or placement of the inner pipe comprising an inlet pipe.

* * * * *